July 9, 1940.  E. O. SEAVER  2,207,600
APPARATUS FOR MAKING SEPARABLE FASTENERS
Filed Aug. 1, 1936
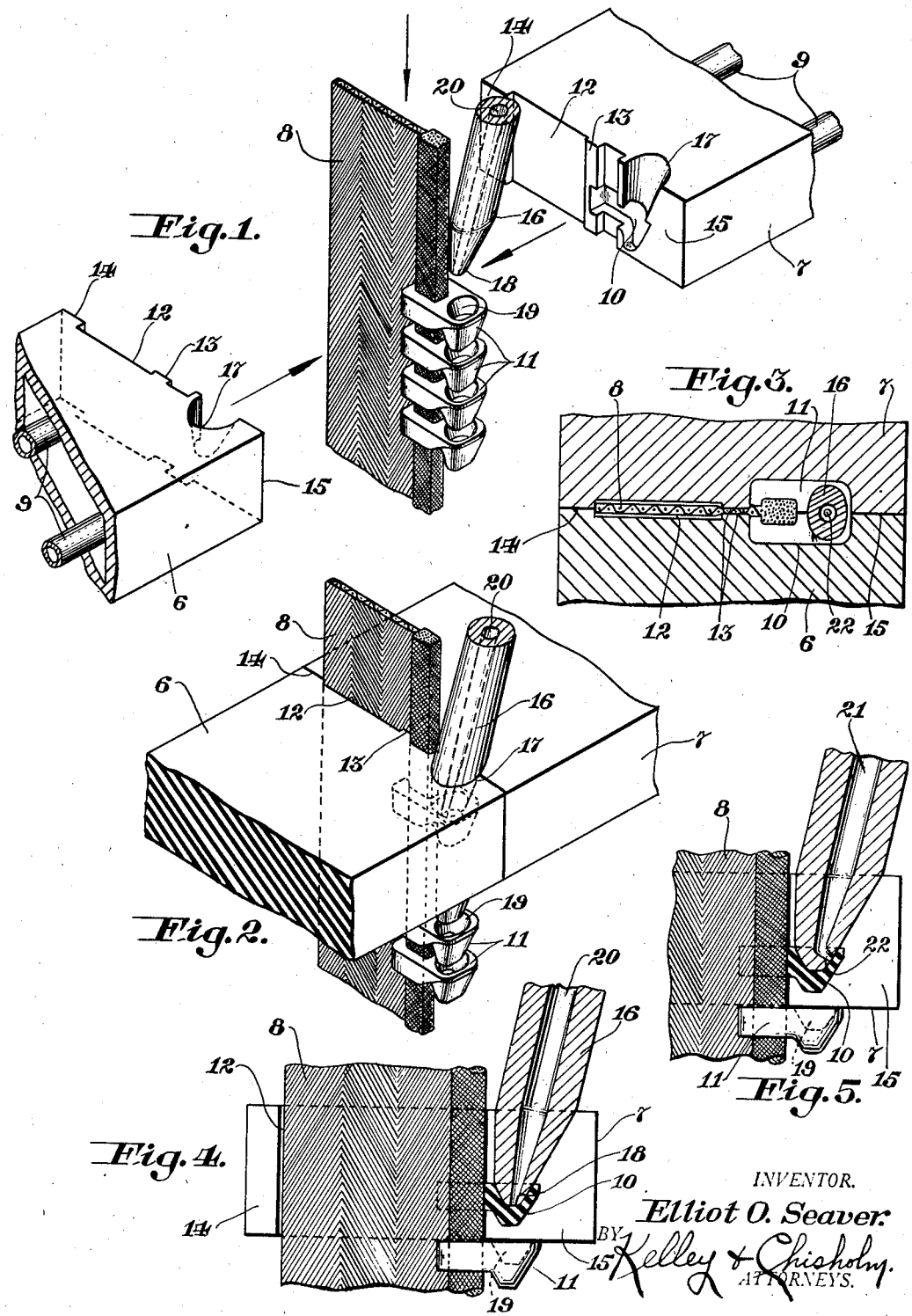
INVENTOR.
Elliot O. Seaver.
BY Kelley & Chisholm
ATTORNEYS.

Patented July 9, 1940

2,207,600

UNITED STATES PATENT OFFICE 2,207,600

APPARATUS FOR MAKING SEPARABLE FASTENERS

Elliot O. Seaver, Meadville, Pa., assignor to Talon, Inc., a corporation of Pennsylvania Application August 1, 1936, Serial No. 93,861

1 Claim. (Cl. 18—30)

My invention relates to the art of making separable fasteners of the kind wherein two stringers are provided with closely spaced fastener members which intermesh and interlock under the control of a slider mounted on the fastener members. Such fasteners are commonly in use and known generally as "zippers." Each of the fastener members consists of a portion embracing the edge of the tape and an interlocking portion which projects beyond the edge of the tape, the interlocking portion consisting of a projection on one side and a recess on the opposite side.

My invention relates particularly to an improvement in the apparatus for applying the fastener elements to the tape by a molding process. The molding method broadly has been applied to this art as illustrated in the patent to Marinsky No. 2,041,848, but the method of that patent is somewhat complicated and has the disadvantage that the place where the material is injected into the mold cavity is at the end of the fastener element. An uneven surface at this location is noticeable especially when the elements are molded from plastic materials.

My present invention is intended primarily for molding of plastic materials of the thermoplastic type. Some of these materials which have been developed recently can be molded in the very small sizes of fastener member with great rapidity so that it makes possible the production of fasteners by molding them one at a time on the tape. If desired, a machine utilizing my invention may be employed in which a gang of tapes and molds are fed from the same heating and pressure cylinder.

In the accompanying drawing I have illustrated one embodiment of my invention, the apparatus being illustrated more or less schematically. It will be understood that suitable devices are employed for moving the die parts and for automatically feeding the tape. In the drawing:

Fig. 1 illustrates the die parts in open position and shows a partially formed fastener stringer having some of the elements already molded thereon;

Fig. 2 illustrates in perspective the position of the parts during the injection of the molding material;

Fig. 3 is a cross-sectional view through Fig. 2;

Fig. 4 is a longitudinal section through Fig. 2; and

Fig. 5 is a view similar to Fig. 4, showing a modification.

In carrying out my invention, mold parts 6 and 7 are arranged on opposite sides of the tape 8. Preferably these molds are water cooled by suitable water conduits 9. The meeting faces of the die parts have mold cavities 10, shaped in accordance with the desired shape of the fastener members 11 to be formed on the tape. The opposed faces of the die parts are also recessed, as indicated at 12, so as to fit loosely around the tape and preferably adjacent the die cavities the mold parts are provided with pressure surfaces 13, which grip the tape tightly adjacent the mold cavity. On the opposite sides af the mold parts the surfaces 14, 15 are provided so as to abut tightly against each other when the heavy pressures required to withstand the molding are applied to the mold parts.

Assuming that the tape is in position and the fastener member is ready to be formed, the die parts first close upon the tape and heavy pressure is applied. Next the combined core member and nozzle 16 is inserted into the tapered entrance cavity 17 formed at the junction of the mold parts. The end 18 of the core member is shaped in accordance with the desired shape of the recess 19 in a fastener member and the core member has a passage 20 through which the molding material may be forced after the mold parts are in molding position. The method of injecting the material depends entirely upon the material used. Materials commonly used for injection molding are heated to a semi-liquid state and then injected under high pressure into the mold cavities. After the required time interval, which is preferably as short as possible depending upon the material used, the fastener member has set in position on the tape and the mold parts are retracted. First the core member is moved while the opposed mold parts remain in position, and then the mold parts are withdrawn, the tape advancing one step to the next molding position.

It will be noted that the nozzle member breaks away at the bottom of the recess so that any uneven surface caused by pulling away the nozzle from the mold cavities will not be noticeable and will not interfere with the operation of the fastener. At the same time, the number of parts has been reduced, making for simplification and with the less likelihood of difficulty due to improper fitting of the parts and leakage.

In the modification shown in Fig. 5, the passage 21 for the molding material has its outlet 22 at the side, rather than at the end. In this manner the material may be broken away more cleanly when the core member is removed from the mold cavities. It has the further advantage that the molding material flows principally in one direction from one end to the other of the fastener mold.

While I have shown and described in this application one embodiment and a modification which my invention may assume in practice, it will be understood that this embodiment and modification are merely for the purposes of illustration and that various other forms may be devised within the scope of my invention as set forth in the appended claim.

What I claim as my invention is:

Apparatus for use in molding fastener members for separable fasteners of the class described which comprises opposed mold parts having mold cavities adapted to receive one edge of a fastener tape, said mold cavities being of the desired shape to form the external contour of the fastener member and having an entrance cavity a portion of which is in one mold part and a portion of which is in the other mold part adapted to receive when the mold parts are closed together an injection member, and an injection member having a passage extending longitudinally therethrough having an injection end adapted to fit tightly into said entrance cavity when the mold parts are closed, the end of said injection member projecting into the mold cavity, said end of said member being tapered and having a shape corresponding to the shape of the recess in a fastener member whereby it serves as a core element in molding the fastener member, the orifice in the end of the injection member being located in the core portion of said member.

ELLIOT O. SEAVER.